US010655564B2

(12) United States Patent
Gormley

(10) Patent No.: US 10,655,564 B2
(45) Date of Patent: May 19, 2020

(54) THRUST REVERSER SYSTEM WITH HIDDEN BLOCKER DOORS

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 755 days.

(21) Appl. No.: 15/154,516

(22) Filed: May 13, 2016

(65) Prior Publication Data
US 2017/0328304 A1 Nov. 16, 2017

(51) Int. Cl.
F02K 1/72 (2006.01)
F02K 1/76 (2006.01)
F02K 3/06 (2006.01)

(52) U.S. Cl.
CPC ............... F02K 1/72 (2013.01); F02K 1/763 (2013.01); F02K 3/06 (2013.01); F05D 2220/327 (2013.01); F05D 2260/904 (2013.01)

(58) Field of Classification Search
CPC . F02K 1/72; F02K 1/763; F02K 1/766; F02K 3/06; F05D 2260/904; F05D 2220/327
See application file for complete search history.

(56) References Cited

U.S. PATENT DOCUMENTS

| 2,943,443 A | 7/1960 | Voymas |
| 3,024,605 A | 3/1962 | Nash |
| 3,497,165 A | 2/1970 | Sutton et al. |
| 3,500,646 A | 3/1970 | Hom et al. |
| 3,587,973 A | 6/1971 | Wolf et al. |
| 3,600,894 A | 8/1971 | McClain |
| 3,612,209 A | 10/1971 | Vdoviak et al. |

(Continued)

FOREIGN PATENT DOCUMENTS

| DE | 102011008918 | 7/2012 |
| EP | 0926333 | 6/1999 |
| WO | 2011073558 | 6/2011 |

OTHER PUBLICATIONS

Mohd Siddiqui, "Review Of Thrust Reverser Mechanism Used In Turbofan Jet Engine Aircraft", International Journal of Engineering Research and Technology, ISSN 0974-3154 vol. 6, No. 5, International Research Publication House, 2013, pp. 717-726.

(Continued)

Primary Examiner — Carlos A Rivera
(74) Attorney, Agent, or Firm — O'Shea Getz P.C.

(57) ABSTRACT

An assembly is provided for an aircraft propulsion system with an axial centerline. This assembly includes a nacelle structure and a thrust reverser system. The nacelle structure includes a fan cowl, where a forward cavity extends axially into the nacelle structure from an aft end of the fan cowl. The thrust reverser system includes a sleeve, a cascade structure, a blocker door and a linkage. The sleeve is configured to translate axially along the centerline and relative to the nacelle structure between a forward stowed position and an aft deployed position. The cascade structure, the blocker door and the linkage are at least partially within the forward cavity when the sleeve is in the forward stowed position. The cascade structure is fixedly attached to the sleeve. The linkage extends between and is pivotally attached to the cascade structure and the blocker door.

17 Claims, 11 Drawing Sheets

(56) References Cited

U.S. PATENT DOCUMENTS

| | | |
|---|---|---|
| 4,564,160 A | 1/1986 | Vermilye |
| 4,567,786 A | 2/1986 | Sakurai |
| 5,117,630 A | 6/1992 | Cariola |
| 5,255,850 A | 10/1993 | Cockerham |
| 5,309,711 A | 5/1994 | Matthias |
| 5,476,237 A | 12/1995 | Clarke |
| 5,609,020 A | 3/1997 | Jackson |
| 5,778,659 A | 7/1998 | Duesler et al. |
| 5,987,880 A | 11/1999 | Culbertson |
| 6,042,053 A | 3/2000 | Sternberger |
| 6,293,495 B1 | 9/2001 | Aten |
| 6,487,846 B1 | 12/2002 | Chakkera et al. |
| 6,584,763 B2 | 7/2003 | Lymons |
| 7,104,500 B1 | 9/2006 | Smith |
| 7,735,778 B2 | 6/2010 | Lair |
| 7,874,142 B2 | 1/2011 | Beardsley |
| 8,002,217 B2 | 8/2011 | Sternberger |
| 8,109,468 B2 | 2/2012 | Andre et al. |
| 8,172,175 B2 | 5/2012 | Lair |
| 8,793,973 B2 | 8/2014 | Vauchel |
| 8,904,751 B2 | 12/2014 | Howarth et al. |
| 9,181,898 B2 | 11/2015 | Bhatt |
| 2004/0068978 A1 | 4/2004 | Lair et al. |
| 2005/0039438 A1 | 2/2005 | Lair |
| 2005/0151012 A1 | 7/2005 | Lair |
| 2006/0288688 A1 | 12/2006 | Lair |
| 2009/0193789 A1 | 8/2009 | Pero |
| 2009/0321561 A1 | 12/2009 | Andre et al. |
| 2010/0139242 A1 | 6/2010 | Vauchel et al. |
| 2012/0193448 A1 | 8/2012 | Caruel |
| 2012/0304621 A1 | 12/2012 | Stuart |
| 2013/0205753 A1 | 8/2013 | Todorovic |
| 2014/0150403 A1 | 6/2014 | Stuart et al. |
| 2015/0267640 A1 | 9/2015 | Gormley |
| 2015/0308380 A1 | 10/2015 | Biset |
| 2016/0160799 A1 | 6/2016 | Gormley |
| 2016/0363097 A1* | 12/2016 | Foutch .............. F02K 1/72 |

OTHER PUBLICATIONS

EP search report for EP17171124.5 dated Oct. 16, 2017.

* cited by examiner

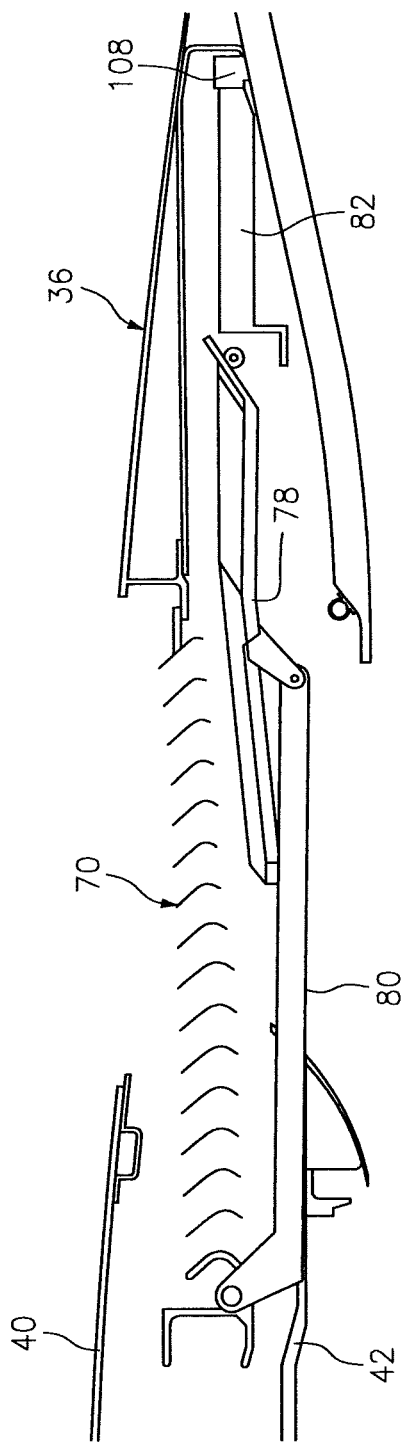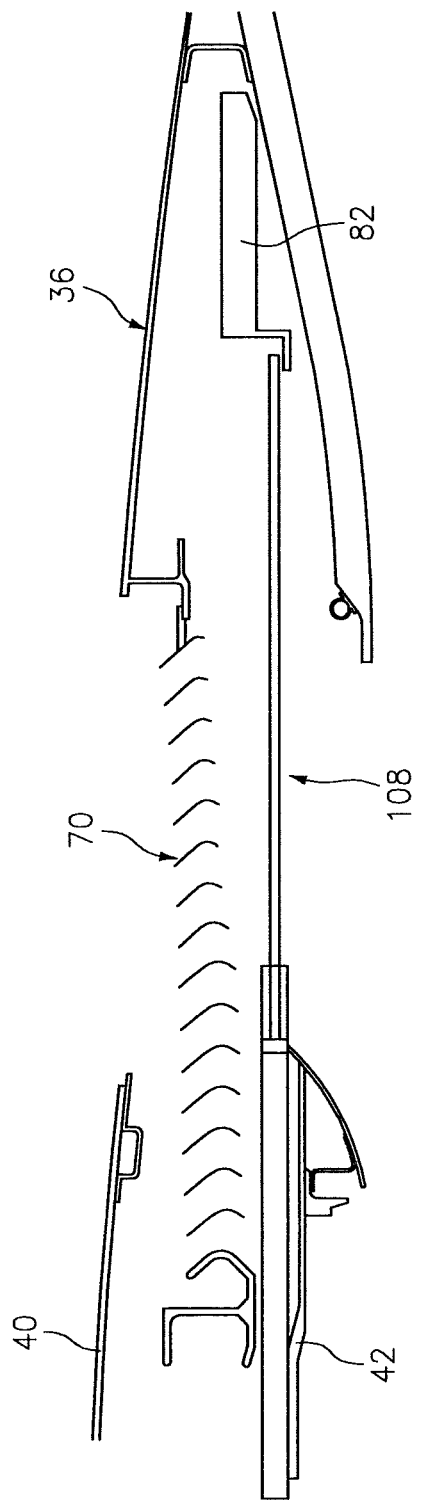

THRUST REVERSER SYSTEM WITH HIDDEN BLOCKER DOORS

BACKGROUND OF THE INVENTION

1. Technical Field

This disclosure relates generally to an aircraft propulsion system and, more particularly, to a thrust reverser system for an aircraft propulsion system.

2. Background Information

A propulsion system for an aircraft may include a thrust reverser system for providing reverse thrust. Various types and configurations of thrust reverser systems are known in the art. While these thrust reverser systems have various advantages, there is still a need in the art for an improved thrust reverser system.

SUMMARY OF THE DISCLOSURE

According to an aspect of the present disclosure, an assembly is provided for an aircraft propulsion system with an axial centerline. This assembly includes a nacelle structure and a thrust reverser system. The nacelle structure includes a fan cowl, where a forward cavity extends axially into the nacelle structure from an aft end of the fan cowl. The thrust reverser system includes a sleeve, a cascade structure, a blocker door and a linkage. The sleeve is configured to translate axially along the centerline and relative to the nacelle structure between a forward stowed position and an aft deployed position. The cascade structure, the blocker door and the linkage are at least partially within the forward cavity when the sleeve is in the forward stowed position. The cascade structure is fixedly attached to the sleeve. The linkage extends between and is pivotally attached to the cascade structure and the blocker door.

According to another aspect of the present disclosure, another assembly is provided for an aircraft propulsion system with an axial centerline. This assembly includes a fan case, a fan cowl and a thrust reverser. The fan cowl covers the fan case, where a forward cavity is radially between the fan case and the fan cowl. The thrust reverser system includes a sleeve, a cascade structure, a blocker door and a linkage. The sleeve is configured to translate axially along the centerline and relative to the nacelle structure between a forward stowed position and an aft deployed position. The cascade structure, the blocker door and the linkage are at least partially within the forward cavity when the sleeve is in the forward stowed position. The cascade structure is configured to move axially with the sleeve as the sleeve translates axially between the forward stowed position and the aft deployed position. The linkage extends between and is pivotally attached to the cascade structure and the blocker door.

The blocker door may be configured to move axially out of the forward cavity as the sleeve translates axially from the forward stowed position to an intermediate position. A forward end of the blocker door may be configured to swing radially inward into a bypass gas path of the aircraft propulsion system as the sleeve axially translates from the intermediate position to the aft deployed position.

The linkage may be operable to cause the forward end of the blocker door to swing radially inward into the bypass gas path.

A forward end of the linkage may be pivotally attached to the cascade structure and may be operable to move substantially axially as the sleeve translates axially from the forward stowed position to the aft deployed position. An aft end of the linkage may be pivotally attached to the blocker door and may be operable to move axially and radially inward as the sleeve translates axially from the intermediate position to the aft deployed position.

The aft end of the linkage may be further operable to move substantially axially as the sleeve translates axially from the forward stowed position to the intermediate position.

The thrust reverser system may include a device configured to initiate the radially inward swinging of the forward end of the blocker door.

The thrust reverser system may include a door carrier arranged with the sleeve. The blocker door may be pivotally attached to the door carrier and extends between the linkage and the door carrier. The door carrier may be configured to move substantially axially as the sleeve translates axially from the forward stowed position to the intermediate position. The door carrier may be configured to be substantially stationary as the sleeve translates axially from about the intermediate position to the aft deployed position.

The thrust reverser system may include a door carrier arranged with the sleeve. The blocker door may be pivotally attached to the door carrier and extends between the linkage and the door carrier. The door carrier may be configured to move axially with the sleeve as the sleeve translates axially from the forward stowed position to the intermediate position. The door carrier may be configured to move axially relative to the sleeve as the sleeve translates axially from the intermediate position to the aft deployed position.

The cascade structure may be substantially completely within the forward cavity and/or the linkage may be substantially completely within the forward cavity when the sleeve is in the forward stowed position.

The blocker door may be partially within the forward cavity when the sleeve is in the forward stowed position.

An aft cavity may extend axially into the sleeve from a forward end of the sleeve. A forward end portion of the blocker door may be within the forward cavity and an aft end portion of the blocker door may be within the aft cavity when the sleeve is in the forward stowed position.

The thrust reverser system may include a door carrier within the aft cavity. The blocker door may be pivotally attached to the door carrier and extend between the linkage and the door carrier. The door carrier may be configured to selectively move axially relative to the nacelle structure and the sleeve.

The nacelle structure may include a torque box. The forward cavity may be formed radially between the torque box and the fan cowl.

The thrust reverser system may include a second linkage that extends between and may be pivotally attached to the cascade structure and the blocker door. The second linkage may be within the forward cavity when the sleeve is in the forward stowed position.

The blocker door may be configured to move axially out of the forward cavity as the sleeve translates axially from the forward stowed position to an intermediate position. A forward end of the blocker door may be configured to swing radially inward into a bypass gas path of the aircraft propulsion system as the sleeve axially translates from the intermediate position to the aft deployed position.

The thrust reverser system may include a door carrier arranged with the sleeve. The blocker door may be pivotally attached to the door carrier and extend between the linkage and the door carrier. The door carrier may be configured to move axially with the sleeve as the sleeve translates axially from the forward stowed position to about the intermediate position. The door carrier may be configured to be substantially stationary as the sleeve translates axially from about the intermediate position to the aft deployed position.

An aft cavity may extend axially into the sleeve from a forward end of the sleeve. A forward end portion of the blocker door may be within the forward cavity and an aft end portion of the blocker door may be within the aft cavity when the sleeve is in the forward stowed position. The door carrier may be within the aft cavity.

The foregoing features and the operation of the invention will become more apparent in light of the following description and the accompanying drawings.

BRIEF DESCRIPTION OF THE DRAWINGS

FIGS. 17 and 18 are side cutaway illustrations of the aft, half portion of the aircraft propulsion system with the translating sleeve in an intermediate position.

DETAILED DESCRIPTION

Figure 1:
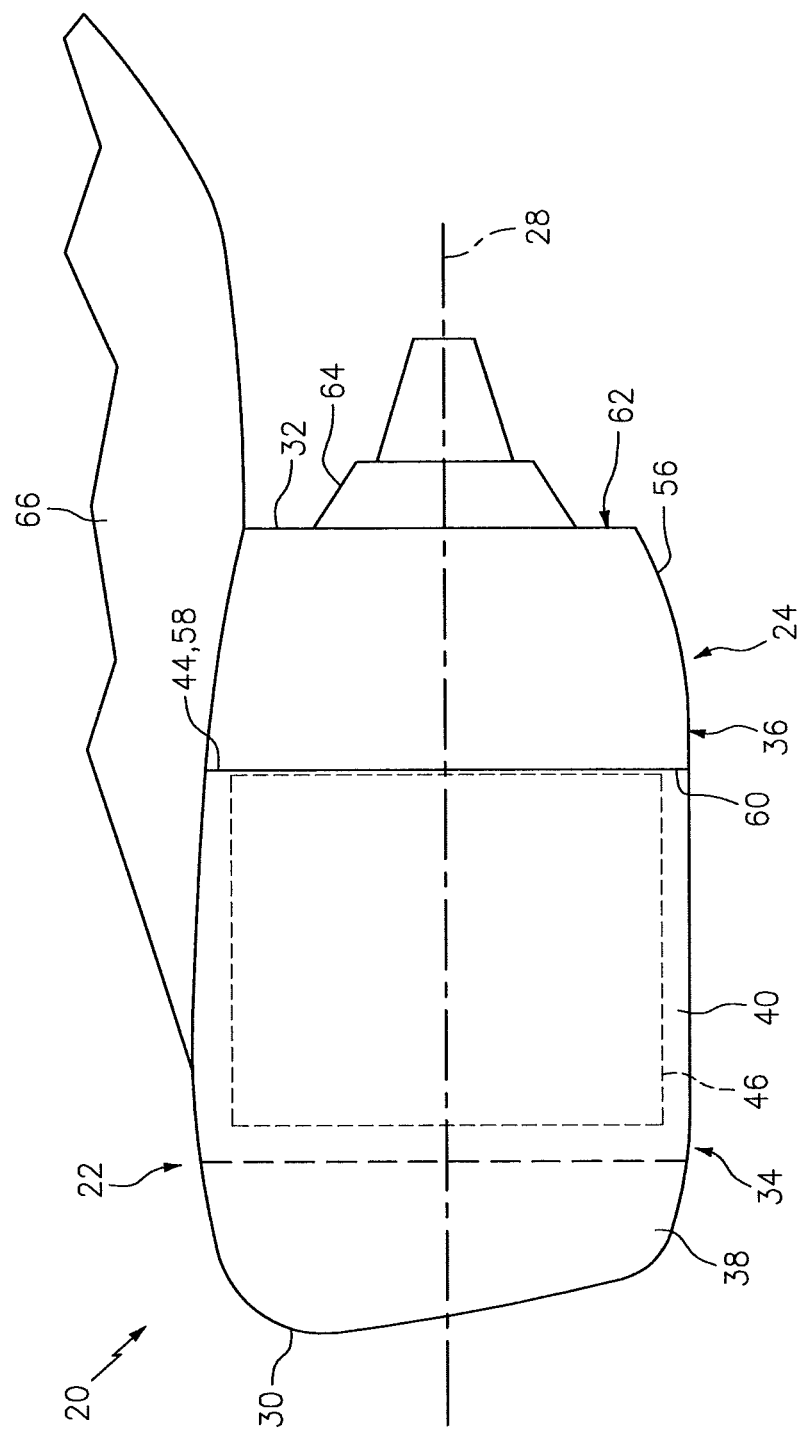
FIG. 1 is a side illustration of an aircraft propulsion system with a thrust reverser translating sleeve in a forward stowed position.

FIG. 1 illustrates an aircraft propulsion system 20 for an aircraft such as a commercial airliner. The propulsion system 20 includes a nacelle 22 and a gas turbine engine. This gas turbine engine may be configured as a turbofan engine as generally illustrated in FIG. 1. Alternatively, the gas turbine engine may be configured as a turbojet engine or any other type of gas turbine engine capable of propelling the aircraft. The propulsion system 20 also includes a thrust reverser system 24 configured with the nacelle 22; see also FIGS. 2 to 4.

The nacelle 22 substantially circumscribes and provides an aerodynamic covering for the gas turbine engine. The nacelle 22 also folios a bypass gas path 26 (see FIG. 3) with the gas turbine engine. This bypass gas path 26 bypasses a core of the gas turbine engine and is operable to route a majority (e.g., more than 75%) of engine thrust out of the aircraft propulsion system 20 in the case of a turbofan engine configuration.

The nacelle 22 extends along an axial centerline 28 between a forward nacelle end 30 and an aft nacelle end 32. The nacelle 22 includes a forward nacelle structure 34 and an aft nacelle structure, which is configured as or otherwise includes a translating sleeve 36; e.g., a thrust reverser sleeve.

Figure 3:
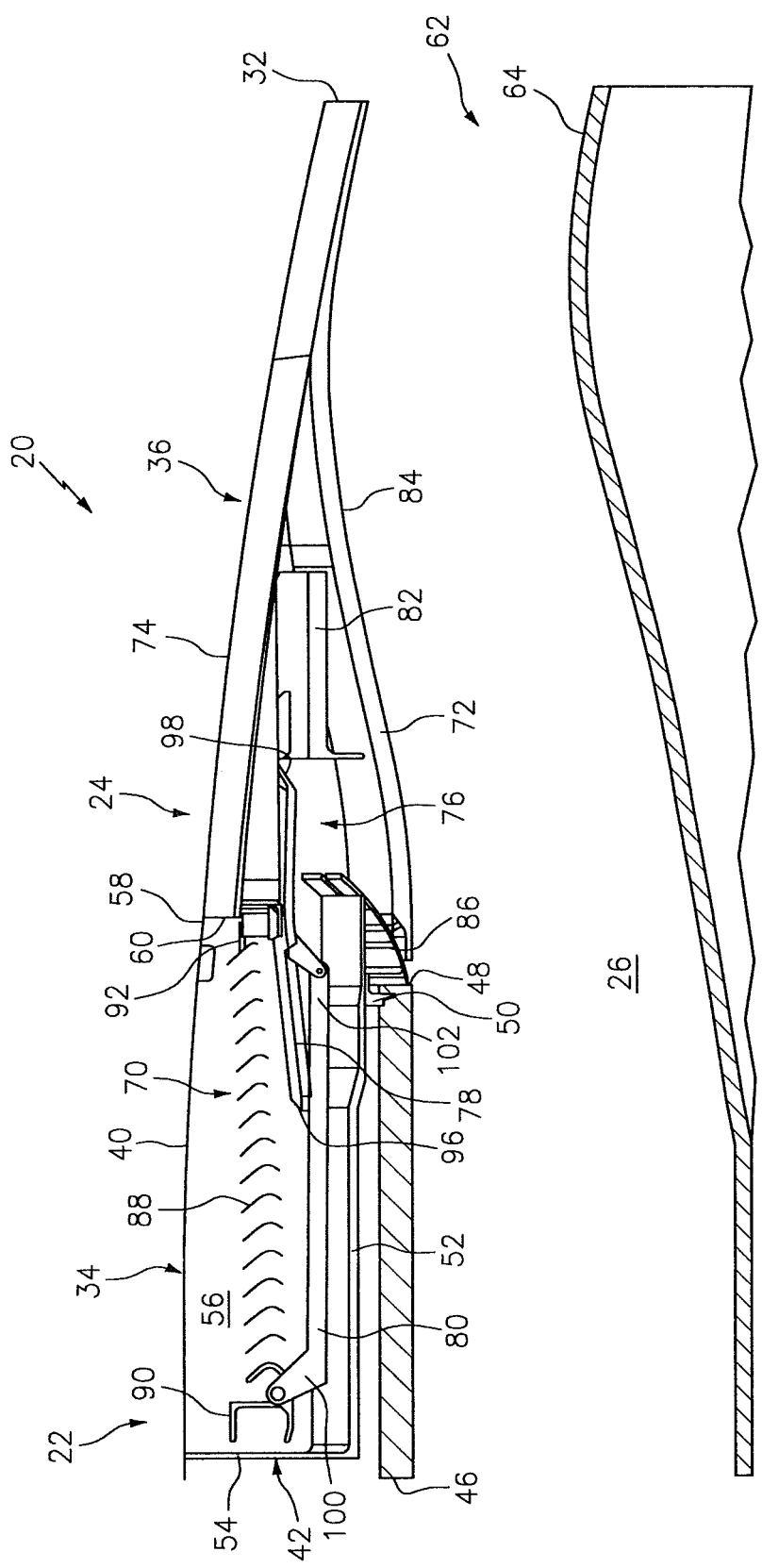
FIG. 3 is a side cutaway illustration of an aft, half portion of the aircraft propulsion system with the translating sleeve in the forward stowed position.

The forward nacelle structure 34 includes an inlet structure 38 (e.g., module or cowl), a fan cowl 40 and a stationary support 42 (see FIG. 3). The inlet structure 38 is disposed at the forward nacelle end 30. The inlet structure 38 is configured to direct a stream of air through an inlet opening at the forward nacelle end 30 and into the gas turbine engine.

The fan cowl 40 is disposed axially between the inlet structure 38 and the translating sleeve 36. The fan cowl 40 of FIG. 1, in particular, is disposed at an aft end 44 of the forward nacelle structure 34, and extends forward to the inlet structure 38. This fan cowl 40 is generally axially aligned with a fan section of the gas turbine engine. The fan cowl 40 is configured to provide an aerodynamic covering for a fan case 46, which circumscribes the fan section and partially forms an outer peripheral boundary of the bypass gas path 26; see FIG. 3.

Referring to FIG. 3, the stationary support 42 may be configured as a torque box for the thrust reverser system 24. This stationary support 42 is attached to the fan case 46 at (e.g., on, adjacent or proximate) an aft end 48 of the fan case 46.

The stationary support 42 extends circumferentially about the centerline 28 and substantially circumscribes the fan case 46. The stationary support 42, for example, may include a pair of parti-annular segments (e.g., halves) arranged on opposing sides of the propulsion system 20. Alternatively, the stationary support 42 may have a substantially annular unitary body; e.g., may extend more than three-hundred and thirty degrees around the centerline 28.

The stationary support 42 includes a mounting flange 50, an axial portion 52 and a radial portion 54. The mounting flange 50 projects radially inward from the axial portion 52 and into a channel in the fan case 46, thereby mounting the stationary support 42 to the fan case 46; of course, the present disclosure is not limited to such a mounting configuration. The axial portion 52 extends generally axially forward from the mounting flange 50 to the radial portion 54. The radial portion 54 extends radially outward from the axial portion 52 to a distal end, which may (or may not) radially engage (directly or indirectly) and provide radial support to the fan cowl 40.

With the foregoing configuration, one or more forward cavities 56 are formed by and radially between the fan cowl 40 and the stationary support 42. Of course in other embodiments, the stationary support 42 may also include a second (outer) axial portion which is opposite and overlaps the axial portion 52, and is connected to the axial portion 52 by the radial portion 54. In this manner, the stationary support 42 may form the forward cavities 56.

Referring again to FIG. 3, each forward cavity 56 extends axially into the forward nacelle structure 34 from an aft end 58 of the fan cowl 40 to an aft surface the radial portion 54 of the stationary support 42. Each forward cavity 56 extends radially within the stationary support 42 between an inner surface of the fan cowl 40 and an outer surface of the axial portion 52 of the stationary support 42. The forward cavities 56 are disposed on opposing sides of the propulsion system 20, where each forward cavity 56 extends circumferentially (less than 180 degrees) about the centerline 28 within the forward nacelle structure 34. Of course, in other embodiments, the forward nacelle structure 34 may include a single forward cavity, which extends more than 180 degrees about the centerline 28.

Referring again to FIG. 1, the translating sleeve 36 is disposed at the aft nacelle end 32 and extends axially between a forward end 60 thereof and the aft nacelle end 32. The translating sleeve 36 is configured to further partially form the outer peripheral boundary of the bypass gas path 26 (see FIG. 3), which extends through the propulsion system 20 to a nozzle 62. The translating sleeve 36 may also form the nozzle 62 with an inner fairing assembly 64 (often referred to as "an inner fixed structure"), which houses the core of the gas turbine engine.

The translating sleeve 36 may have a substantially tubular body; e.g., may extend more than three-hundred and thirty degrees around the centerline 28. Alternatively, the translating sleeve 36 may include a pair of sleeve segments (e.g., halves) arranged on opposing sides of the propulsion system 20. The present disclosure, however, is not limited to the foregoing exemplary sleeve configurations.

Figure 2:
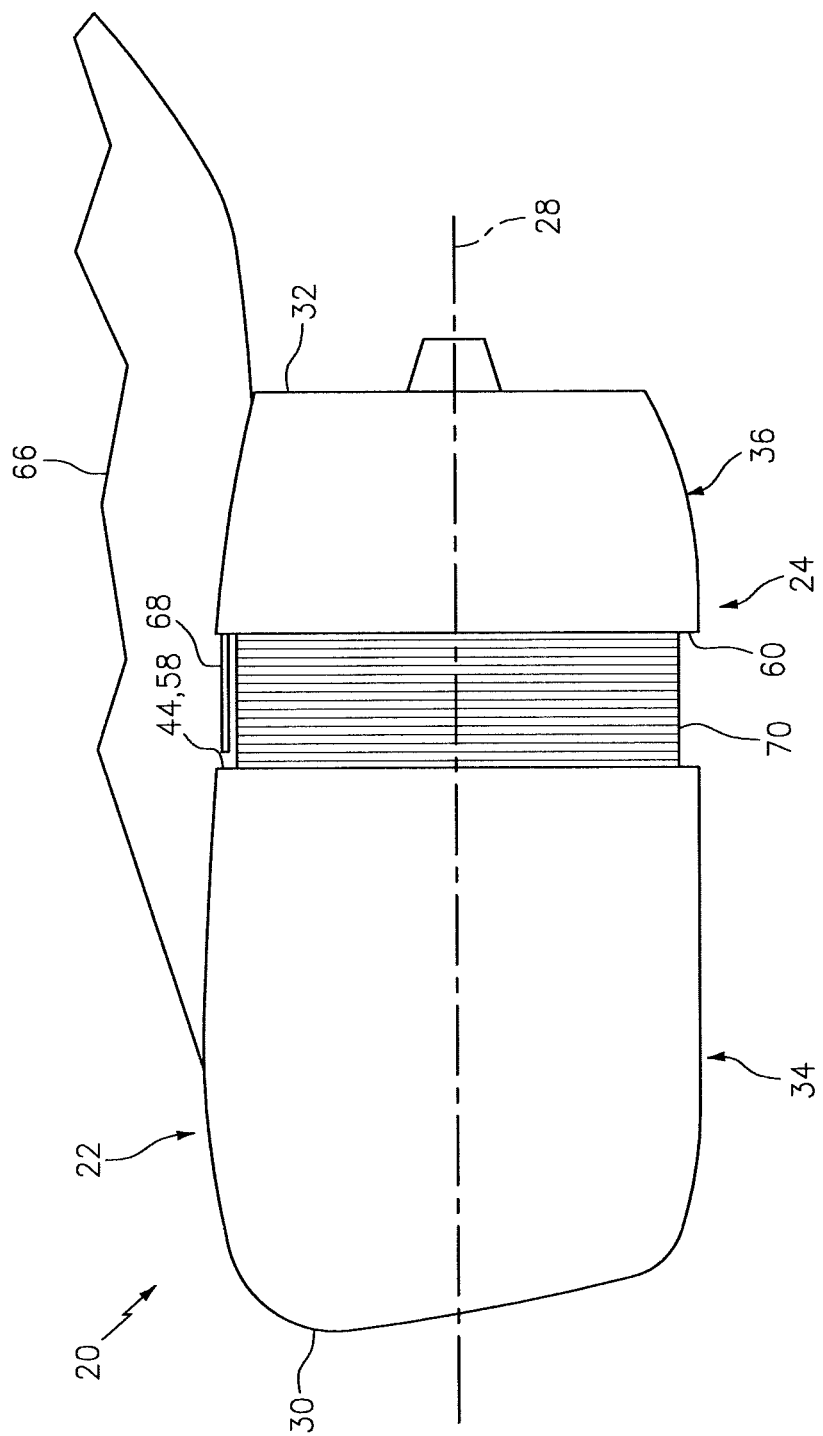
FIG. 2 is a side illustration of the aircraft propulsion system with the translating sleeve in an aft deployed position.

Referring to FIGS. 1 and 2, the translating sleeve 36 is configured as a translatable structure. The translating sleeve 36, for example, is indirectly (or alternatively directly) slidably connected to a stationary structure 66 (e.g., a pylon) through rail 68 (see FIG. 2) on track beams (not shown) disposed on opposing sides of the stationary structure 66 and/or other suitable translatable joints. In this manner, the translating sleeve 36 may translate axially along the centerline 28 and relative to the forward nacelle structure 34. The translating sleeve 36 may thereby move axially between a forward stowed position (see FIG. 1; see also FIG. 3) and an aft deployed position (see FIG. 2; see also FIG. 4). In the forward stowed position, the translating sleeve 36 provides the functionality described above. In the aft deployed position, the translating sleeve 36 at least partially (or substantially completely) uncovers at least one of more other components of the thrust reverser system 24 such as, but not limited to, one or more cascade structures 70.

Referring to FIG. 3, the translating sleeve 36 includes an inner portion 72 and an outer portion 74. These inner and outer portions 72 and 74 extend axially from the forward end 60 of the translating sleeve 36 to the aft nacelle end 32, where the portion 72 and 74 join at the nozzle 62. The inner and outer portions 72 and 74 form one or more aft cavities 76. Each aft cavity 76 extends axially partially into the translating sleeve 36 from the forward end 60 of the translating sleeve 36. Each aft cavity 76 extends radially within the translating sleeve 36 between the inner and outer portions 72 and 74. The aft cavities 76 are disposed on opposing sides of the propulsion system 20, where each aft cavity 76 extends circumferentially (less than 180 degrees) about the centerline 28 within the translating sleeve 36. Of course, in other embodiments, the translating sleeve 36 may include a single aft cavity, which extends more than 180 degrees about the centerline 28.

Figure 5:
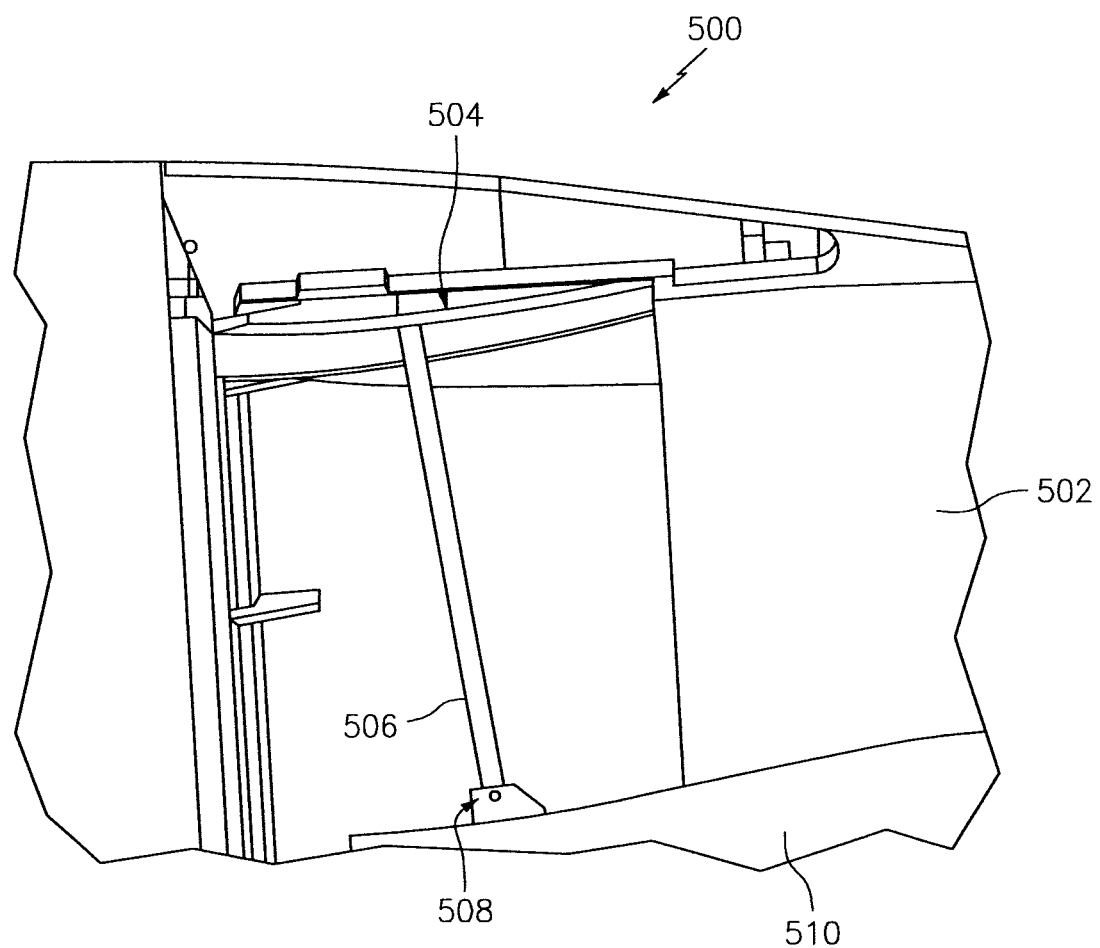
FIG. 5 is a side cutaway illustration of an aft, half portion of a prior art aircraft propulsion system with its translating sleeve in the forward stowed position.

The forward and aft cavities 56 and 76 are provided with the nacelle 22 to house one or more components of the thrust reverser system 24 (when stowed) and, thereby, provide the bypass gas path 26 with fewer flow obstructions during typical forward flight propulsion system 20 operation. By contrast, referring now to FIG. 5, a typical prior art thrust reverser system 500 includes multiple components which can obstruct air flow through a bypass gas path 502 even when stowed. These components can include blocker doors 504, where gaps (seams) between each blocker door 504 and adjacent elements can disrupt and turbulate boundary layer air flow. The component can also include drag links 506 and associated fittings 508, which fittings 508 project into the bypass gas path 502 and to secure the drag links 506 to an inner fixed structure 510, and which the drag links 506 extend radially through the bypass gas path 502 between the fittings 508 and the blocker doors 504.

Figure 6:
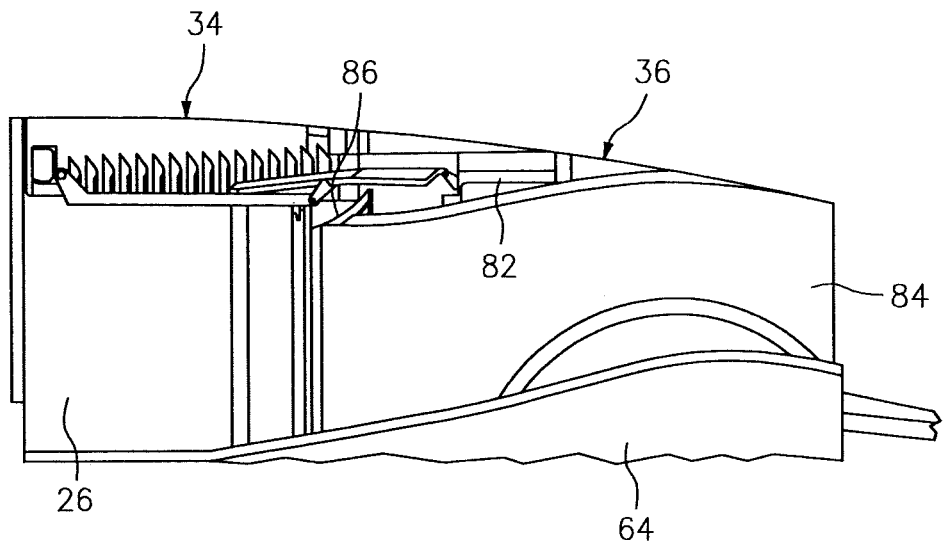
FIG. 6 is another side cutaway illustration of the aft, half portion of the aircraft propulsion system with the translating sleeve in the forward stowed position, which depicts a substantially uninterrupted inner surface of the translating sleeve.

Referring again now to FIG. 3, the thrust reverser system 24 of the present disclosure includes the translating sleeve 36, one or more cascade structures 70, one or more blocker doors 78, one or more linkages 80, and one or more door carriages 82. To reduce flow obstructions to air flow within the bypass gas path 26, the thrust reverser components (e.g., 70, 78, 80 and 82) are arranged within at least one of the cavities 56, 76 when stowed. In this manner, the inner portion 72 of the translating sleeve 36 may have a substantially uninterrupted inner surface 84 that substantially axially abuts against the fan case 46 when stowed (see also FIG. 6). Of course, an axial gap may exist between the fan case 46 and the inner surface 84 depending on the specific configuration of other nacelle structures such as a fan ramp fairing 86.

The cascade structures 70 are arranged about the centerline 28, for example, on opposing sides of the propulsion system 20. Each cascade structure 70 includes a cascade 88 and one or more mounts 90 and 92. The cascade 88 includes an axial array of turning vanes. The cascade 88 is connected to and extends axially between the forward mount 90 and the aft mount 92. The aft mount 92 fixedly attaches the respective cascade structure 70 to the translating sleeve 36 at, for example, the forward end 60 of the translating sleeve 36.

Figure 7:
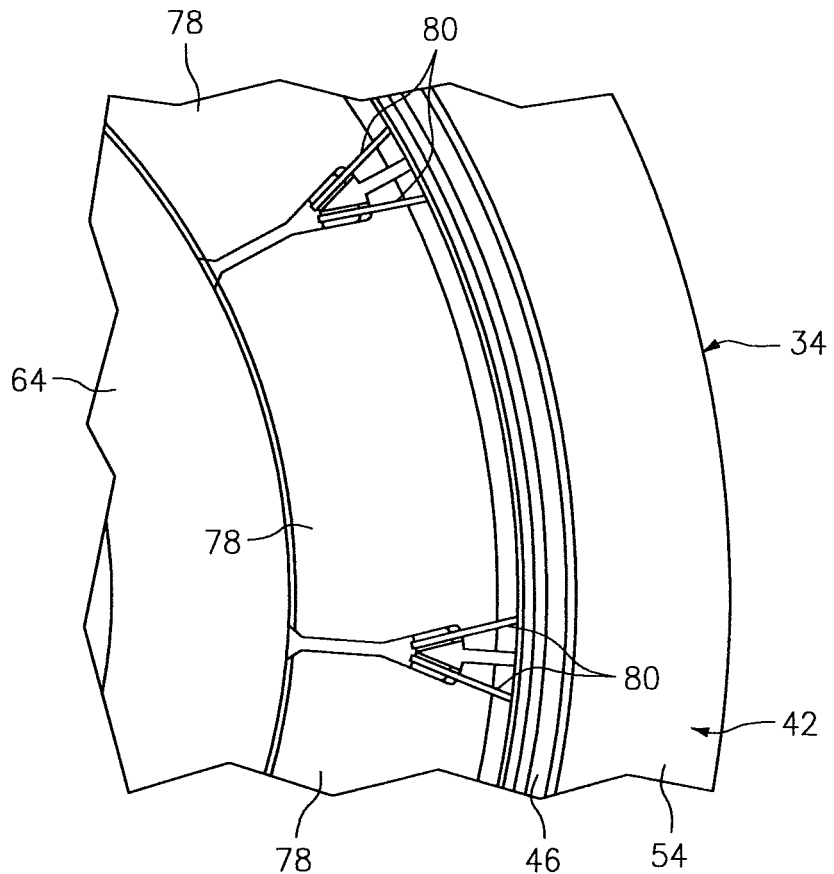
FIG. 7 is an illustration of deployed blocker doors within a portion of a bypass gas path of the aircraft propulsion system.
Figure 8:
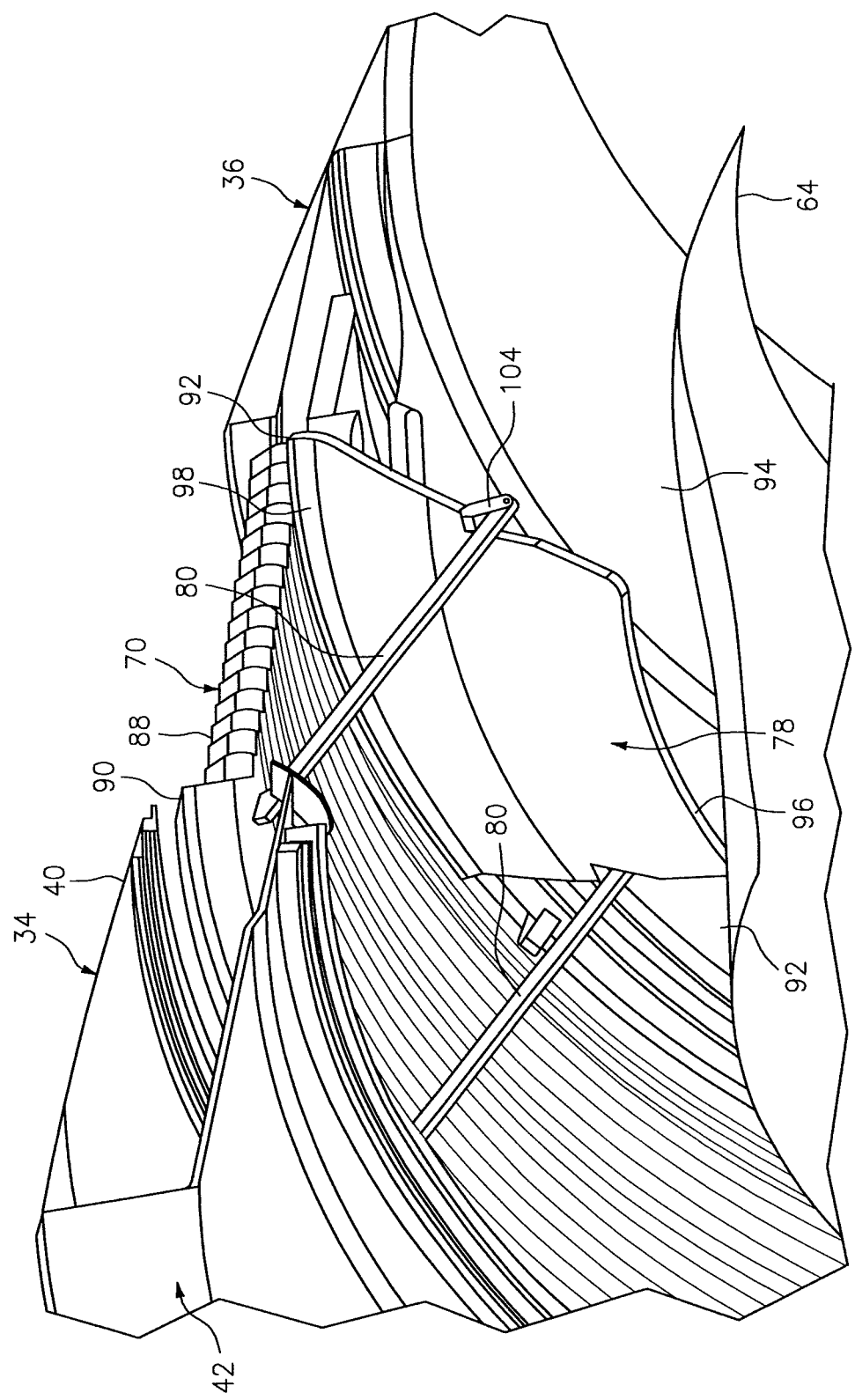
FIG. 8 is a perspective sectional illustration of the aft, half portion of the aircraft propulsion system with the translating sleeve in the aft deployed position, where only one deployed blocker door is shown for clarity.

The blocker doors 78 are arranged about the centerline 28 in, for example, a pair of parti-annular arrays; see also FIG. 7. These parti-annular arrays of the blocker doors 78 may be arranged respectively on opposing sides of the propulsion system 20, where each of the parti-annular arrays is aligned with a respective one of the cascade structures 70. Referring to FIG. 8, each of the blocker doors 78 (one shown in FIG. 8 for clarity) extends circumferentially between opposing sides 94. Each of the blocker doors 78 extends axially between a forward end 96 and an aft end 98. It is worth noting, the terms "forward" and "aft" are used herein to describe the relative positions of the ends 96 and 98 when the respective blocker door 78 is stowed (see FIG. 3), but this relative orientation could change in alternative embodiments, depending on the specific configuration of the thrust reverser system 24, when the blocker door 78 is fully deployed.

Figure 4:
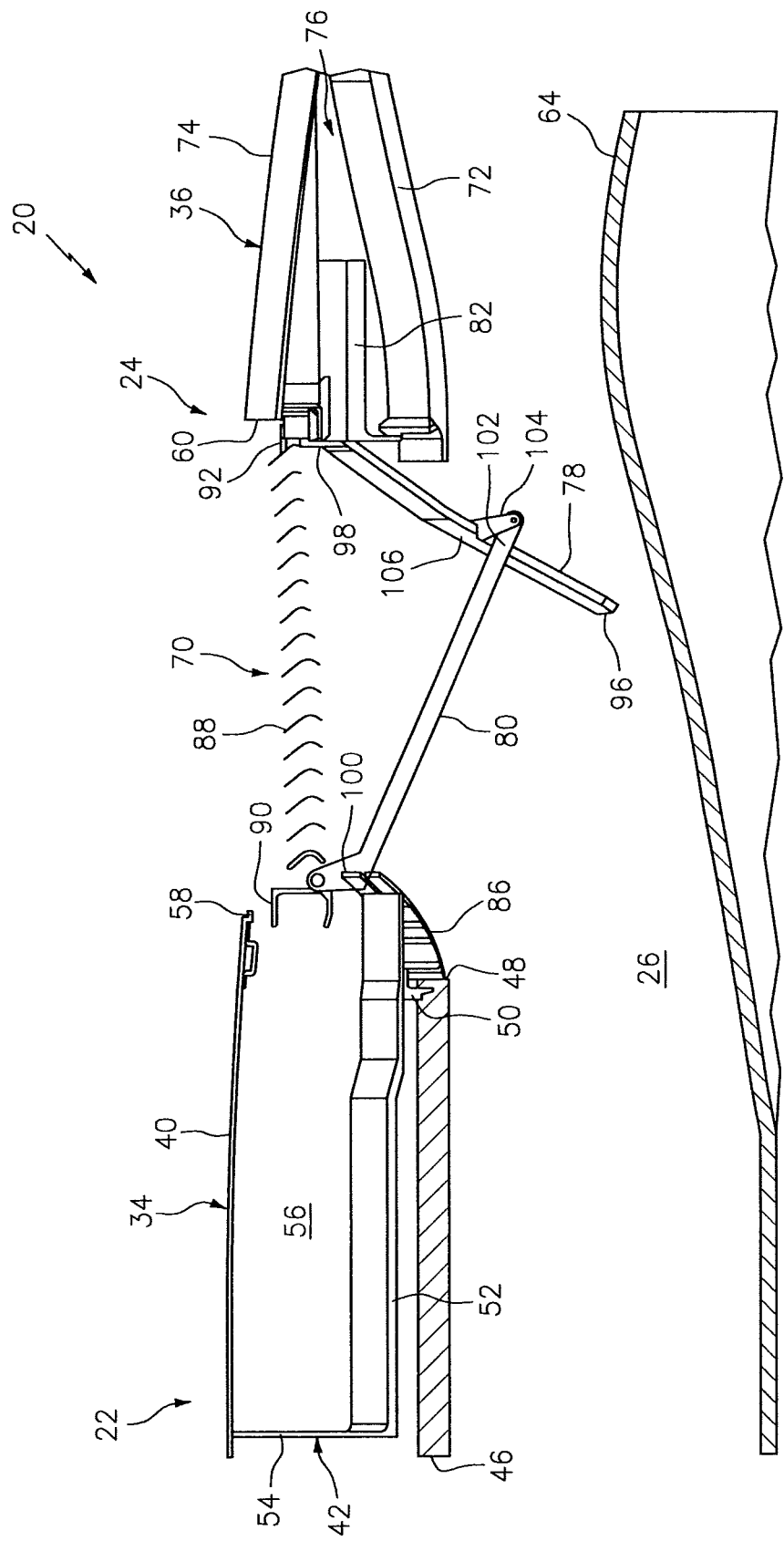
FIG. 4 is a side cutaway illustration of the aft, half portion of the aircraft propulsion system with the translating sleeve in the aft deployed position.

The linkages 80 may be arranged in a plurality of linkage pairs, where each of the linkage pairs is associated with a respective one of the blocker doors 78. However, in other embodiments, one or more of the blocker doors 78 may be associated with a single one of the linkages 80. Referring again to FIG. 8, the linkages 80 in each linkage pair may be disposed at the opposing sides 94 of the respective blocker door 78. Referring now to FIGS. 3 and 4, each of the linkages 80 extends between a forward mounting portion 100 and an aft mounting portion 102. The forward mounting portion 100 is pivotally attached (e.g., directly via a pin joint) to the cascade structure 70 and, more particularly, the forward mount 90. The aft mounting portion 102 is pivotally attached (e.g., directly via a pin joint) to the blocker door 78 and, more particular, a mount 104 projecting radially inward from a panel 106 of the blocker door 78; see also FIG. 8. The mount 104 of FIG. 8 is positioned at an axial intermediate location along the respective circumferential side of the blocker door 78; however, other locations are also contemplated.

Referring to FIGS. 3 and 4, at least one of the door carriages 82 is associated with a respective one of the blocker doors 78. Each of the door carriages 82 is configured to move (e.g., translate) axially between a stowed position (see FIG. 3) and a deployed position (see FIG. 4). Each of the door carriages 82, for example, may slide along axially extending rails (not shown), which may be connected to the translating sleeve 36 or another structure.

Figure 9:
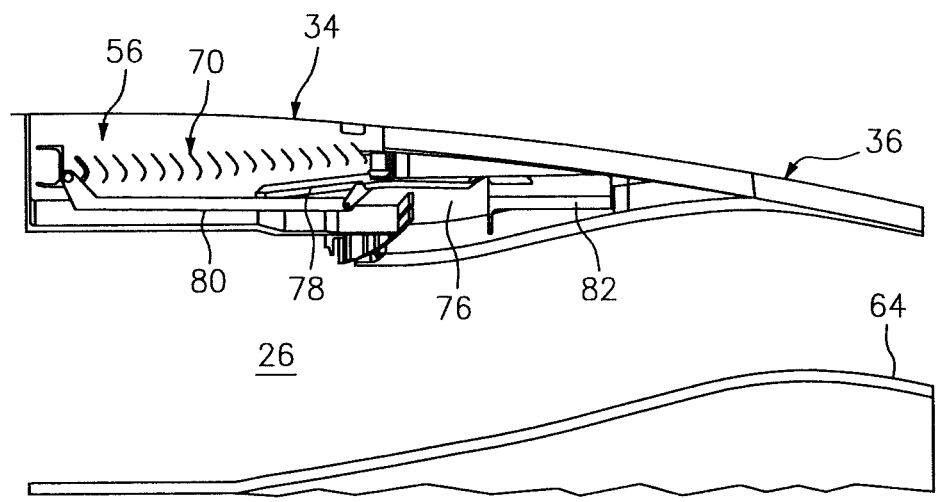
FIGS. 9-16 are side cutaway illustrations of the aft, half portion of the aircraft propulsion system, which illustrations depict a sequence of a thrust reverser system being deployed.
Figure 10:
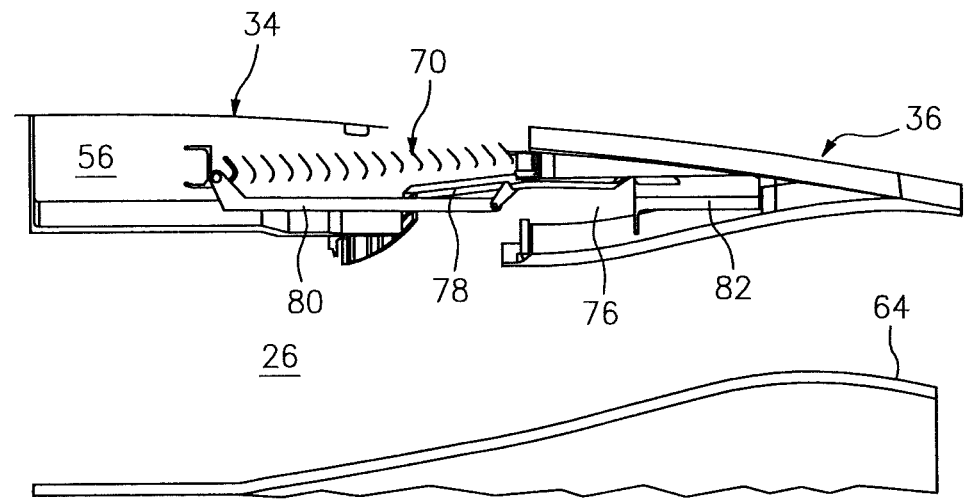
Figure 16:
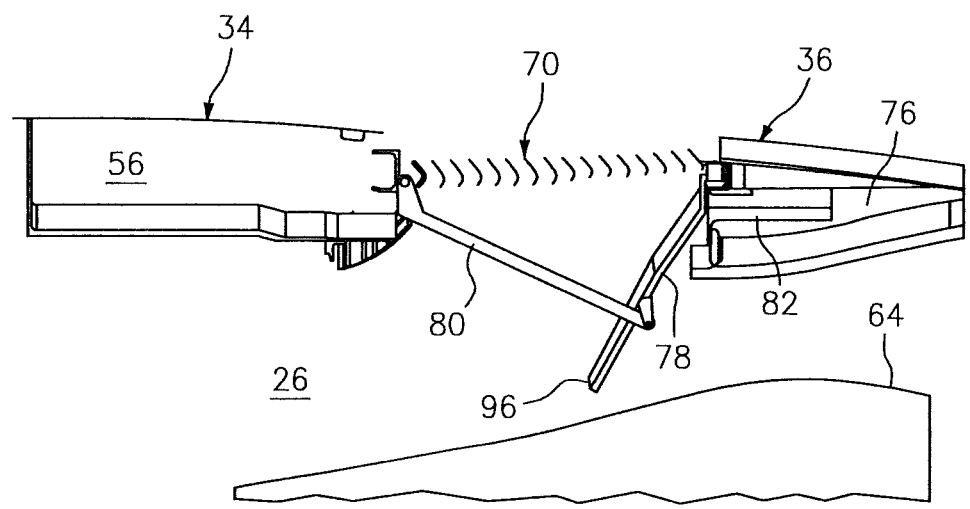

The door carriages 82 may be configured to move axially along with the translating sleeve 36 during a portion of the translating sleeve 36 stroke. The translating sleeve 36, however, may also be configured to move relative to the door carriages 82 during another portion of the translating sleeve 36 stroke. For example, referring to FIGS. 9-11, the translating sleeve 36 and the door carriages 82 may move synchronously together as the sleeve 36 moves from the forward stowed position (see FIG. 9) to an intermediate position (see FIG. 11). However, referring to FIGS. 11-16, the translating sleeve 36 may move axially relative to and aft away from the door carriages 82 as the sleeve 36 moves from the intermediate position (see FIG. 11) to the aft deployed position (see FIG. 16). This relative movement may be enabled by stopping the axial movement of the door carriages 82 when the sleeve 36 is at the intermediate position; e.g., the door carriages 82 become substantially stationary. However, the present disclosure is not limited to the foregoing exemplary embodiment.

To substantially stop movement of the door carriages 82, at least one stop 108 may be provided. Exemplary embodiments of such a stop 108 are shown in FIGS. 17 and 18.

During propulsion system 20 operation, the thrust reverser system 24 may be actuated and deployed as illustrated by the sequence of FIGS. 9-16. At the start of this deployment sequence (see FIG. 9), the thrust reverser components 70, 78, 80 and 82 are within the cavities 56 and 76 as described above. More particularly, the components 70 and 80 are substantially completely within the forward cavities 56. The blocker doors 78 are within both the forward and aft cavities 56 and 76, where a forward portion of each blocker door 78 projects axially into the respective forward cavity 56 and an aft portion of each blocker door 78 projects axially into the respective aft cavity 76. The door carriers 82 may be completely within the aft cavities 76.

During a first portion of the deployment sequence (see FIGS. 9-11), the components 70, 78, 80 and 82 move substantially axially in a direction away from the forward nacelle structure 34. More particularly, translating sleeve 36 translates axially aft from the forward stowed position to the intermediate position. During this axial translation, the cascade structures 70 (which are fixedly attached to the translating sleeve 36) move the thrust reverser components 70, 78, 80 and 82 axially with the translating sleeve 36, thereby pulling the blocker doors 78 and at least aft portions of the linkages 80 out of the forward cavities 56.

Figure 11:
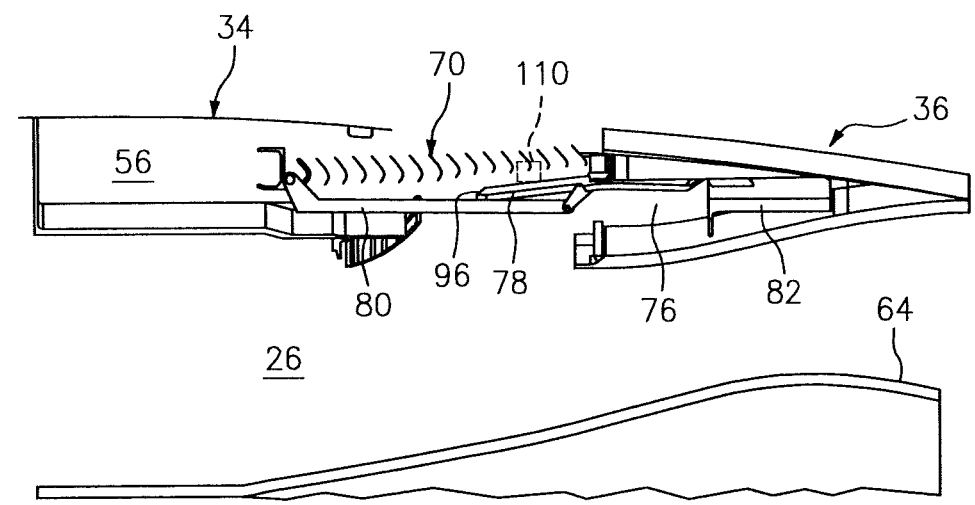
Figure 12:
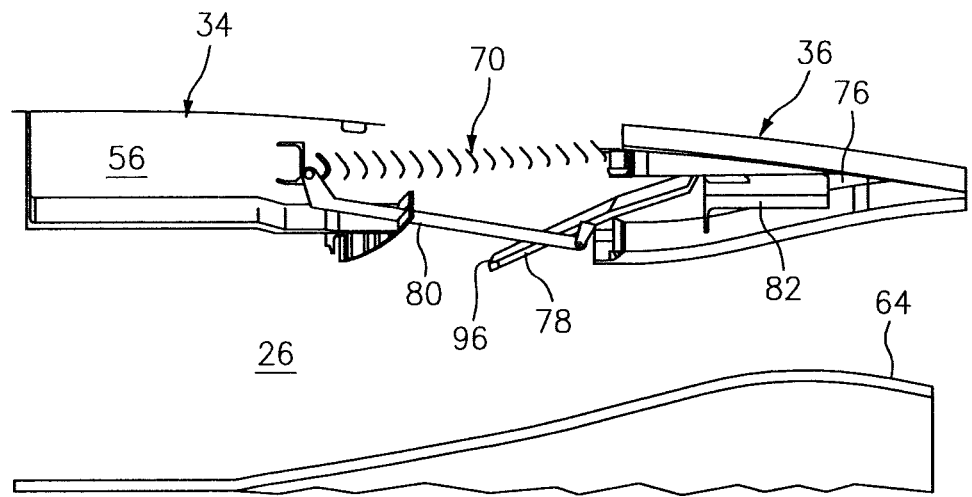
Figure 13:
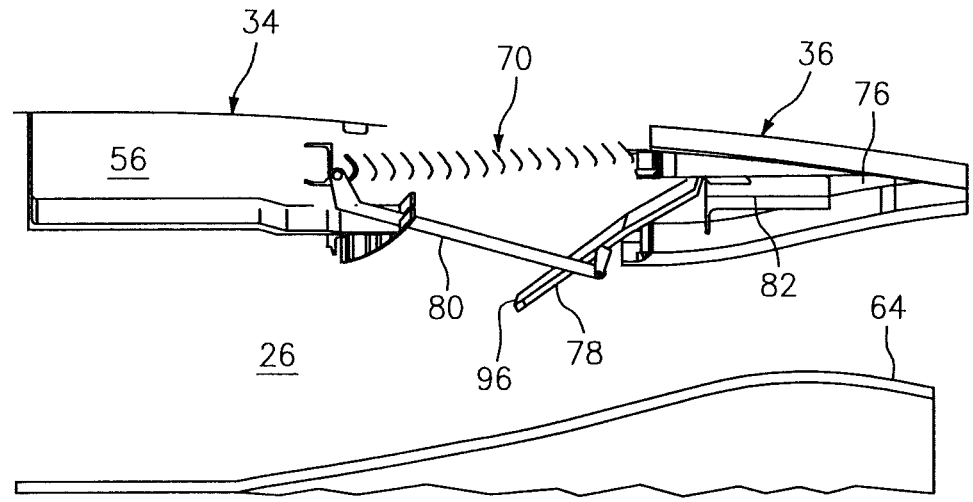
Figure 14:
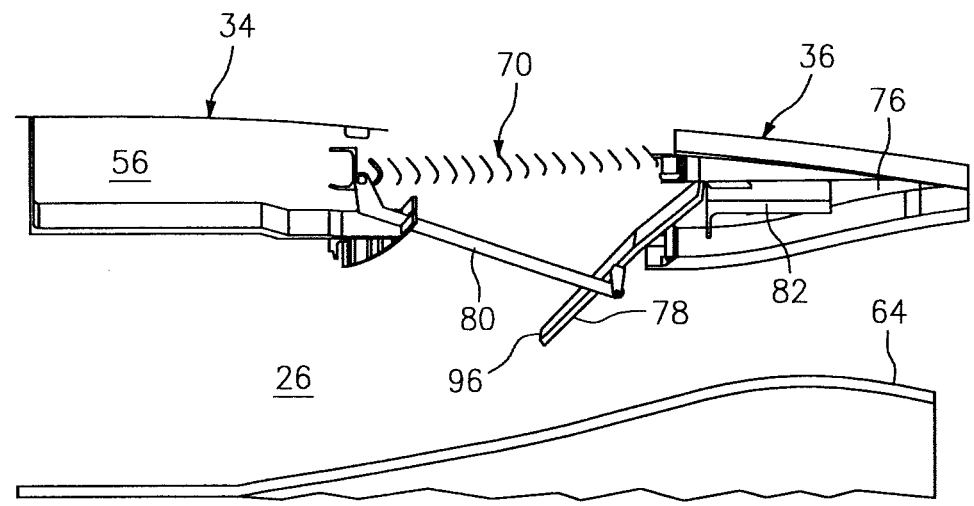
Figure 15:
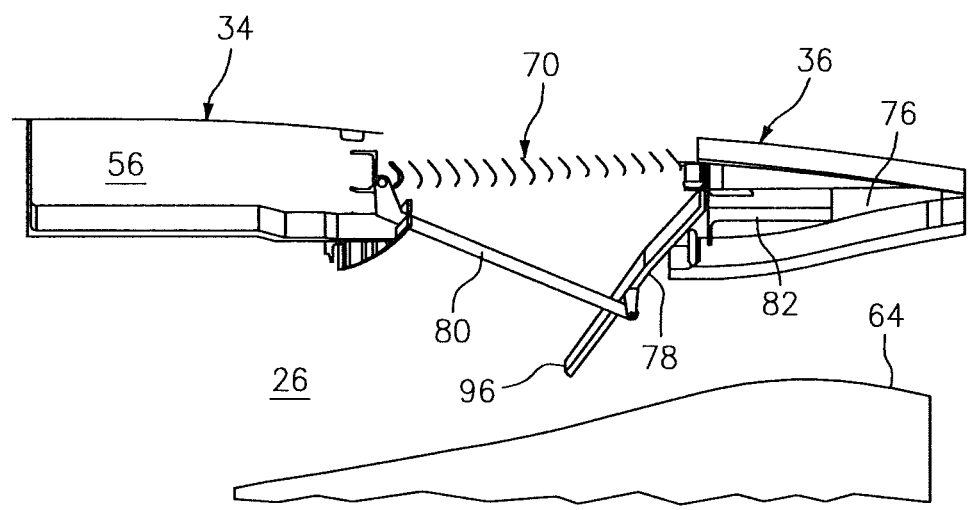

At the intermediate position of FIG. 11, the axial movement of the door carriages 82 is stopped. Thus, during the second portion of the deployment sequence (see FIGS. 11-16), the translating sleeve 36 continues to move substantially axially in the direction away from the forward nacelle structure 34 without the door carriages 82. As a result, an axial distance between the door carriages 82 and the forward mount 90 decreases causing the linkages 80 and the blocker doors 78 to swing radially inward and into the bypass gas path 26 in order to account for this decrease. More particularly, the forward ends of the linkages 80 move substantially axially with the cascade structures 70, whereas the aft ends of the linkages 80 move axially and radially (swing radially inwards). This movement of the aft ends of the linkages 80 in turn causes the forward ends of the blocker doors 78 swing radially inwards (i.e., both axially aft and radially down) while the aft ends of the blocker doors 78 are substantially axially and radially stationary (aside from a pivoting motion).

To initiate/facilitate the radial inward swing of the thrust reverser components 78 and 80, one or more of these components 78, 80 may be biased radially inwards using one or more devices 110 such as springs or actuators, shown in FIG. 11 in block diagram form. These devices 110 may also serve to prevent backward movement (e.g., radial outward swing) of the thrust reverser components 78, 80. Of course, the thrust reverser system 24 may be configured without such devices 110. It is also worth noting, air flow through the bypass gas path 26 may provide a motive force to facilitate radial inward swing of the thrust reverser components once the forward ends of the blocker doors 78 catch this air.

In some embodiments, a length of the translating sleeve 36 may be shortened relative to a length of a prior art translating sleeve. This shortening may be enabled by positioning the blocker doors 78 (when stowed) within the forward cavities 56 in the forward nacelle structure 34, rather than with the translating sleeve.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. An assembly for an aircraft propulsion system with an axial centerline, comprising:
   a nacelle structure including a fan cowl, a forward cavity extending axially into the nacelle structure from an aft end of the fan cowl; and
   a thrust reverser system including a sleeve, a cascade structure, a blocker door and a linkage;
   the sleeve configured to translate axially along the centerline and relative to the nacelle structure between a forward stowed position and an aft deployed position; and
   the cascade structure, the blocker door and the linkage at least partially within the forward cavity when the sleeve is in the forward stowed position;
   the cascade structure fixedly attached to the sleeve such that a position of the cascade structure relative to the sleeve remains constant as the sleeve translates from the forward stowed position to the aft deployed position;
   the linkage extending between and pivotally attached to the cascade structure and the blocker doors;
   the blocker door configured to move axially out of the forward cavity as the sleeve translates axially from the forward stowed position to an intermediate position; and a forward end of the blocker door configured to swing radially inward into a bypass gas path of the aircraft propulsion system as the sleeve axially translates from the intermediate position to the aft deployed position.

2. The assembly of claim 1, wherein the linkage is operable to cause the forward end of the blocker door to swing radially inward into the bypass gas path.

3. The assembly of claim 1, wherein
a forward end of the linkage is pivotally attached to the cascade structure and is operable to move axially as the sleeve translates axially from the forward stowed position to the aft deployed position; and
an aft end of the linkage is pivotally attached to the blocker door and is operable to move axially and radially inward as the sleeve translates axially from the intermediate position to the aft deployed position.

4. The assembly of claim 3, wherein the aft end of the linkage is further operable to move axially as the sleeve translates axially from the forward stowed position to the intermediate position.

5. The assembly of claim 1, wherein the thrust reverser system further includes a device configured to initiate the radially inward swinging of the forward end of the blocker door.

6. The assembly of claim 1, wherein
the thrust reverser system further includes a door carrier arranged with the sleeve;
the blocker door is pivotally attached to the door carrier and extends between the linkage and the door carrier; and
the door carrier is configured to move axially as the sleeve translates axially from the forward stowed position to the intermediate position, and is configured to be stationary as the sleeve translates axially from about the intermediate position to the aft deployed position.

7. The assembly of claim 1, wherein
the thrust reverser system further includes a door carrier arranged with the sleeve;
the blocker door is pivotally attached to the door carrier and extends between the linkage and the door carrier; and
the door carrier is configured to move axially with the sleeve as the sleeve translates axially from the forward stowed position to the intermediate position, and is configured to move axially relative to the sleeve as the sleeve translates axially from the intermediate position to the aft deployed position.

8. The assembly of claim 1, wherein the cascade structure is within the forward cavity and/or the linkage is within the forward cavity when the sleeve is in the forward stowed position.

9. The assembly of claim 1, wherein the blocker door is partially within the forward cavity when the sleeve is in the forward stowed position.

10. The assembly of claim 1, wherein
an aft cavity extends axially into the sleeve from a forward end of the sleeve; and
a forward end portion of the blocker door is within the forward cavity and an aft end portion of the blocker door is within the aft cavity when the sleeve is in the forward stowed position.

11. The assembly of claim 10, wherein
the thrust reverser system further includes a door carrier within the aft cavity;
the blocker door is pivotally attached to the door carrier and extends between the linkage and the door carrier; and
the door carrier is configured to selectively move axially relative to the nacelle structure and the sleeve.

12. The assembly of claim 1, wherein the nacelle structure further includes a torque box, and the forward cavity is formed radially between the torque box and the fan cowl.

13. The assembly of claim 1, wherein the thrust reverser system further includes a second linkage that extends between and is pivotally attached to the cascade structure and the blocker door, and the second linkage is within the forward cavity when the sleeve is in the forward stowed position.

14. An assembly for an aircraft propulsion system with an axial centerline, comprising:
a fan case;
a fan cowl covering the fan case, wherein a forward cavity is radially between the fan case and the fan cowl; and
a thrust reverser system including a sleeve, a cascade structure, a blocker door and a linkage;
the sleeve configured to translate axially along the centerline and relative to the fan cowl between a forward stowed position and an aft deployed position; and
the cascade structure, the blocker door and the linkage at least partially within the forward cavity when the sleeve is in the forward stowed position;
the cascade structure configured to move axially with the sleeve as the sleeve translates axially from the forward stowed position to the aft deployed position; and
the linkage extending between and pivotally attached to the cascade structure and the blocker door;
the blocker door configured to move axially out of the forward cavity as the sleeve translates axially from the forward stowed position to an intermediate position;
a forward end of the blocker door configured to swing radially inward into a bypass gas path of the aircraft propulsion system as the sleeve axially translates from the intermediate position to the aft deployed position;
the thrust reverser system further including a door carrier arranged with the sleeve;
the blocker door pivotally attached to the door carrier and extending between the linkage and the door carrier; and
the door carrier configured to move axially with the sleeve as the sleeve translates axially from the forward stowed position to about the intermediate position, and the door carrier configured to be stationary as the sleeve translates axially from about the intermediate position to the aft deployed position.

15. The assembly of claim 14, wherein
an aft cavity extends axially into the sleeve from a forward end of the sleeve;
a forward end portion of the blocker door is within the forward cavity and an aft end portion of the blocker door is within the aft cavity when the sleeve is in the forward stowed position; and
the door carrier is within the aft cavity.

16. The assembly of claim 14, wherein the cascade structure is fixed relative to the sleeve.

17. The assembly of claim 1, wherein the cascade structure contacts the sleeve.

* * * * *